Jan. 10, 1961  C. LIFKA  2,967,722
ANGULAR CONNECTOR FITTINGS FOR FLEXIBLE CONDUIT
Filed May 18, 1959  2 Sheets-Sheet 1

INVENTOR.
CHARLES LIFKA
BY Cullen & Canton
ATTORNEYS

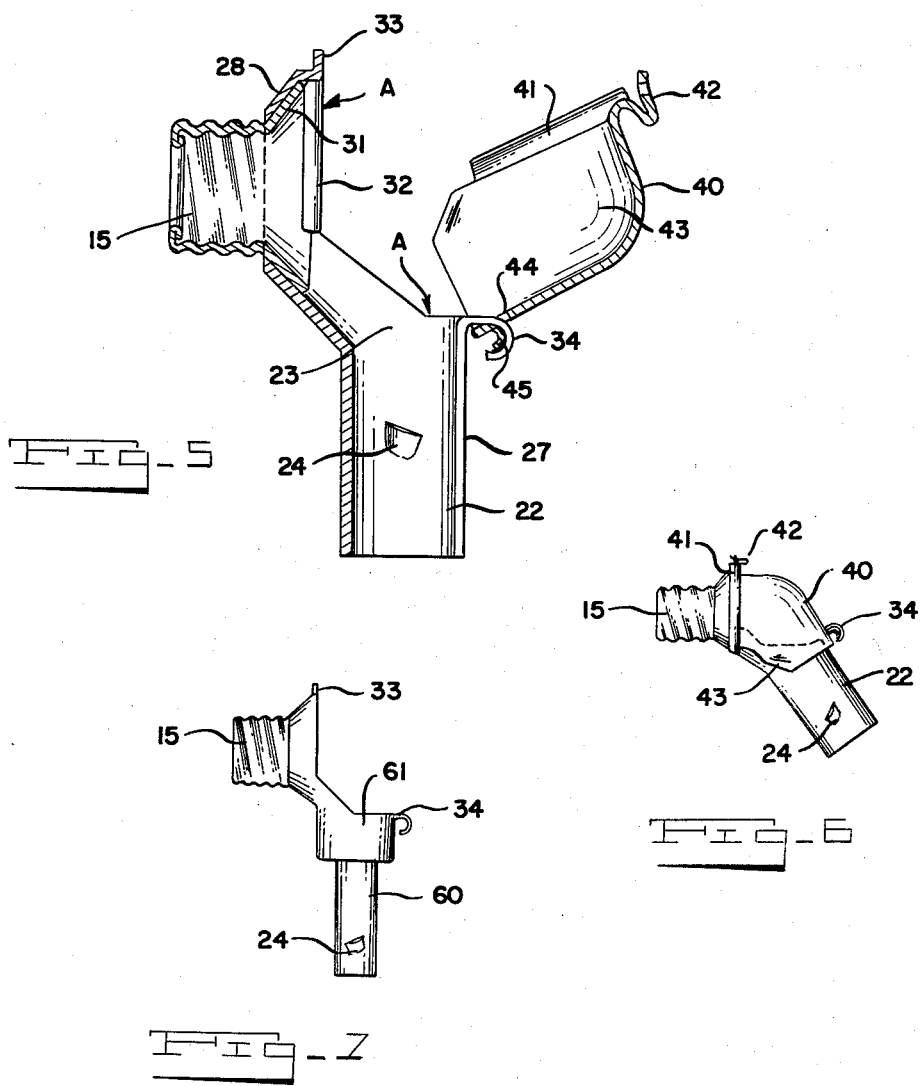

United States Patent Office 2,967,722
Patented Jan. 10, 1961

2,967,722

ANGULAR CONNECTOR FITTINGS FOR FLEXIBLE CONDUIT

Charles Lifka, 20000 Sherwood Ave., Detroit, Mich.

Filed May 18, 1959, Ser. No. 814,049

3 Claims. (Cl. 285—127)

This application relates to connector fittings for flexible conduit and particularly for flexible conduit of the type known to the trade as "Greenfield," and characterized by the fact that the conduit comprises a ridged strip helically wound to provide a helical groove in the interior of the conduit whose turns are separated by a helical ridge.

A straight non-angular fitting for such conduit is shown in my prior Patent No. 2,784,010 of March 5, 1957. In this application I disclose an elbow fitting which can be of a desired bend and has an opening with a hinged non-removable cover.

An object of the present invention is to provide a sheet metal angular fitting for such conduit made inexpensively of three separate members, namely a ferrule, a sleeve member, and a cover with the sleeve member and the cover particularly being stamped out of flat sheet metal stock.

A more specific object of the present invention is to form such fitting in such a way that the cover, though non-removable, can be swung open or closed. When the cover is open, it leaves a gap in the angular space between the sleeve and the ferrule which gap is helpful when bringing wires of the "Greenfield" cable from the sleeve and through the ferrule into the connector box or outlet box with which the device is used. When the cover is closed, it latches itself to the sleeve and closes the gap and completes the enclosure of the wires at the point where such wires are not armored and bend and enter the ferrule and through the ferrule enter the connector box.

Other objects and advantages of this invention will become apparent upon reading the following description of which the attached drawings form a part.

In these drawings:

Fig. 5 is a sectional view as if on a line 5—5 of Fig. 3.

Fig. 6 shows a modified form in which the angle of the fitting is not 90° as is the case with the fittings of Figs. 1 to 5, but is 135°.

Fig. 7 shows a sleeve member per se in a modified form useful for smaller size "Greenfield" than is used with the form shown in Figs. 1 to 6.

Figure 1:
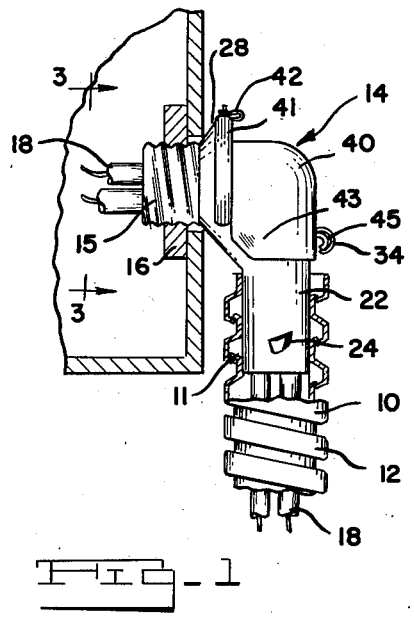
Fig. 1 is a view of the fitting mounted on a conduit and shown with an outlet box.

Referring to the drawings, it will be observed that the flexible conduit known to the trade as "Greenfield" and shown therein and referenced 10 is made up of a strip of ridged sheet metal helically wound to provide a helical groove 11 in the interior of the conduit whose turns are separated by a helical ridge 12.

A fitting 14 having a ferrule 15 and fastened by a nut 16 connects the conduit to a box 17. Conductors 18 of the "Greenfield" bend and enter the box through ferrule 15.

Fitting 14 comprises a thin wall sheet metal tubular sleeve member 21 having a sleeve portion 22 formed to fit inside the conduit with an end 23 projecting forwardly beyond the end of the conduit.

Sleeve 21 has stamped out lugs 24 angularly and longitudinally spaced as indicated in the drawings in position to interlock with the helical ridge 12 of the conduit, all as described in my Patent No. 2,784,010.

Sleeve member 21 is formed of flat sheet metal or the like rolled into a tube split at 27 and lugs 24 are stamped out of the tube.

Sleeve member 21 also has as an integral part, extended from end 23 of sleeve portion 22, a planar portion 28 of ring form whose axis is coincident with the axis of the ferrule 15 and is at an angle to the axis of sleeve portion 22.

Ferrule 15 is an externally threaded tube having one edge flanged outwardly as shown at 31.

Ring portion 28 has its outer edge 32 crimped over outward flange 31 of ferrule 15 to interlock ring portion 28 to ferrule 15. Ring portion 28 also has a fragmentary portion 33 bent radially out from its edge to form a latching lug. Sleeve portion 22 also has near its end 23 a fragmentary portion 34 bent out radially of sleeve portion 22 to form a hook member of a hinge.

Fitting 14 also includes a cover 40 of a contour to fill the gap or area A between end 23 of sleeve portion 22 and ring portion 28. Cover 40 is of U cross section and has on one edge a flange 41 for receiving an edge of ring portion 28. Cover 40 has on its own edge 41 a latching lug 42 extending radially and alined with latching lug 33 of the ring portion edge and in latching engagement therewith when cover 40 is closed. Cover 40 also has its sides 43 fitting over the sides of sleeve portion 22 near its end 23. Cover 40 also has a slot 44 alined with hinge hook member 34 of sleeve portion 22 and receiving member 34 for hingedly but non-removably connecting cover 40 to sleeve portion 22.

The metal stamped out from cover 40 by the formation of slot 44 is not removed but is bent out as shown at 45 to provide a friction grip against the inner surface of latching lug 34 of sleeve portion 22.

In a preferred form, sides 43 of cover 40 are so dimensioned that they engage and tightly grip the sides of sleeve portion 22 at its end 23.

Figure 2:
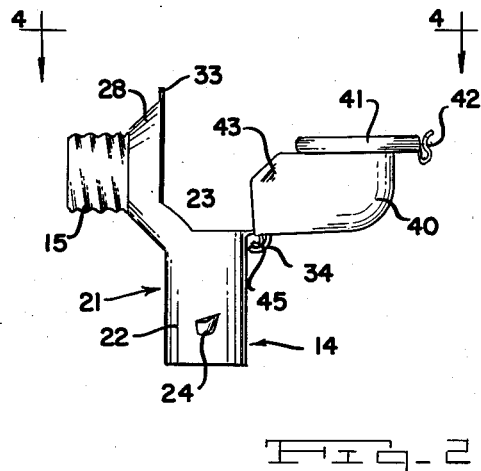
Fig. 2 shows the fitting per se but with the cover open.
Figure 3:
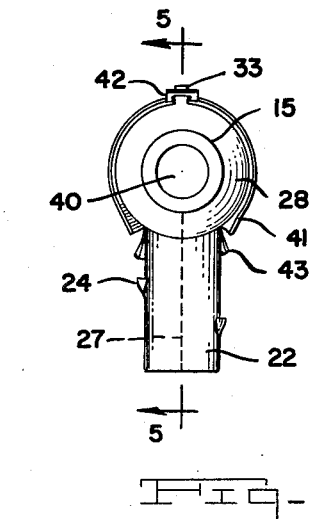
Fig. 3 is a view as if on a line 3—3 of Fig. 1.
Figure 4:
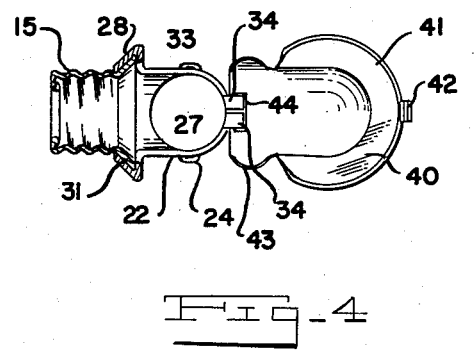
Fig. 4 is a view as if on a line 4—4 of Fig. 2.

In the modified form shown in Fig. 6, the construction is exactly the same as that shown for Figs. 1 to 5 except that the axis of sleeve portion 22, instead of being at 90° with respect to the axis of ferrule 15, is at 135° to provide a 45° fitting instead of the 90° fitting shown in Figs. 1 to 5.

The modification shown in Fig. 7 differs from that shown in Figs. 1 to 5 only in that the sleeve portion has its major part, shown at 60, of smaller diameter than the remaining part, at end 61, to enable the fitting to receive and cooperate with a smaller size of "Greenfield" than is accommodated by the fitting of Figs. 1 to 5 which is of the same dimension as the fitting of Fig. 7 except in the reduction of diameter of the sleeve portion as shown at 60 in Fig. 7.

Now having described the fitting herein shown, reference should be had to the claims which follow.

I claim:

1. A sheet metal angular connector fitting made of three separate members, namely a sleeve member, a ferrule, and a cover; the ferrule being an externally threaded sheet metal tube having its rear edge enlarged by being flanged outwardly to provide a stop for the ferrule when the latter is mounted in a hole in a mounting plate; the sleeve member being made of a flat T-shaped sheet metal blank whose cross bar is rolled into a thin walled sheet metal tubular sleeve portion having a first end formed to fit inside a conduit and having external locking lugs and whose leg is an integral part of and extended from the opposite or second end of the sleeve portion and which is a planar portion of ring form whose axis is at an angle to the axis of the sleeve; the ring portion having its outer edge crimped over the enlarged rear edge or outward flange of the ferrule to reinforce the ferrule flange in its stopping against the mounting plate; the cover being of sheet metal and of a contour to fill the gap or area between the said second end of the sleeve portion and the ring portion and being of U cross section and having on one edge a flange for receiving a ring portion edge and stopping the cover against the ring portion edge; the cover also having its sides fitting over the sides of the sleeve portion at its said second end.

2. A sheet metal angular connector fitting made of three separate members, namely a sleeve member, a ferrule, and a cover; the ferrule being an externally threaded sheet metal tube having its rear edge enlarged by being flanged outwardly to provide a stop for the ferrule when the latter is mounted in a hole in a mounting plate; the sleeve member being made of a flat T-shaped sheet metal blank whose cross bar is rolled into a thin walled sheet metal tubular sleeve portion having a first end formed to fit inside a conduit and having external locking lugs and whose leg is an integral part of and extended from the opposite or second end of the sleeve portion and which is a planar portion of ring form whose axis is at an angle to the axis of the sleeve; the ring portion having its outer edge crimped over the enlarged rear edge or outward flange of the ferrule to reinforce the ferrule flange in its stopping against the mounting plate; the sleeve portion also having a hinge formation at its said second end and opposite the juncture of the sleeve and ring portion; the cover being of sheet metal and of a contour to fill the gap or area between the said second end of the sleeve portion and the ring portion and being of U cross section and having on one edge a flange for receiving a ring portion edge and stopping the cover against the ring portion edge; the cover also having its sides fitting over the sides of the sleeve portion at its said second end; the cover also having a hinge formation alined with the hinge formation of the sleeve portion and cooperating with it for hingedly but non-removably connecting the cover to the sleeve portion at the said second end of the sleeve portion and at a point opposite the juncture of the sleeve and ring portions.

3. A sheet metal angular connector fitting made of three separate members, namely a sleeve member, a ferrule, and a cover; the ferrule being an externally threaded sheet metal tube having its rear edge enlarged by being flanged outwardly to provide a stop for the ferrule when the latter is mounted in a hole in a mounting plate; the sleeve member being made of a flat T-shaped sheet metal blank whose cross bar is rolled into a thin walled sheet metal tubular sleeve portion having a first end formed to fit inside a conduit and having external locking lugs and whose leg is an integral part of and extended from the opposite or second end of the sleeve portion and which is a planar portion of ring form whose axis is at an angle to the axis of the sleeve portion; the ring portion having its outer edge crimped over the enlarged rear edge or outward flange of the ferrule to reinforce the ferrule flange in its stopping against the mounting plate and to interlock it to the ferrule; the ring portion also having at a point opposite the juncture of the ring portion and the sleeve portion a fragmentary portion bent radially out from its outer edge to form a latching lug; the sleeve portion also having at its said second end a fragmentary portion bent out radially of the sleeve portion and opposite the juncture of the sleeve portion and the ring portion to form a hook member of a hinge; the cover being of sheet metal and of a contour to fill the gap or area between the said second end of the sleeve portion and the ring portion and being of U cross section and having on one edge a flange for receiving a ring portion edge and stopping the cover against the ring portion edge; said cover flange having on its own edge a latching lug extending radially and alined with the latching lug of the ring portion edge and in latching engagement therewith; the cover also having its sides fitting over the sides of the sleeve portion at its said second end; the cover also having a slot alined with the hinge hook member of the sleeve portion and receiving it for hingedly but non-removably connecting the cover to the sleeve portion; said cover slot and said latching lug of the cover being on opposite ends of the cover.

References Cited in the file of this patent
UNITED STATES PATENTS

| | | |
|---|---|---|
| 1,887,192 | Betts | Nov. 8, 1932 |
| 1,888,546 | Anderson | Nov. 22, 1932 |
| 2,784,010 | Lifka | Mar. 5, 1957 |